United States Patent [19]

Hisano

[11] Patent Number: 5,584,144
[45] Date of Patent: Dec. 17, 1996

[54] MOTOR VEHICLE DOOR

[75] Inventor: Masaya Hisano, Saitama-ken, Japan

[73] Assignee: Honda Giken Kogyo Kabushiki Kaisha, Tokyo, Japan

[21] Appl. No.: 617,129

[22] Filed: Mar. 18, 1996

[30] Foreign Application Priority Data

Apr. 11, 1995 [JP] Japan .................................. 7-085544

[51] Int. Cl.⁶ ........................................................ B60J 5/04
[52] U.S. Cl. ............................ 49/502; 49/167; 49/351; 296/146.5; 296/146.7; 296/153
[58] Field of Search .......................... 49/502, 167, 351; 296/153, 146.7, 146.1, 152, 146.5

[56] References Cited

U.S. PATENT DOCUMENTS

| | | | |
|---|---|---|---|
| 4,151,683 | 5/1979 | Narita et al. | 49/502 |
| 4,815,984 | 3/1989 | Sugiyama et al. | 49/502 X |
| 4,882,842 | 11/1989 | Basson et al. | 296/146.5 X |
| 4,934,099 | 6/1990 | Maekawa et al. | 49/502 X |
| 5,092,647 | 3/1992 | Ueda et al. | 49/502 X |
| 5,355,629 | 10/1994 | Kimura et al. | 49/502 |

FOREIGN PATENT DOCUMENTS

| | | |
|---|---|---|
| 2262761 | 6/1993 | United Kingdom . |
| 2262957 | 7/1993 | United Kingdom . |

*Primary Examiner*—Philip C. Kannan
*Attorney, Agent, or Firm*—Armstrong, Westerman, Hattori, McLeland & Naughton

[57] ABSTRACT

A motor vehicle door has a door main body made up by coupling an inner panel to a door panel and a door lining mounted on the inner panel. The inner panel is provided, in a recessed manner, with containing recessed portions for receiving therein various outfits to be mounted on the motor vehicle door. The inner panel is also integrally provided, in a projecting manner, with a pocket mounting base for fastening thereto a bottom portion of a pocket which is detachably attached to an armrest portion of the door lining.

2 Claims, 2 Drawing Sheets

MOTOR VEHICLE DOOR

BACKGROUND OF THE INVENTION

1. Field of the Invention

The present invention relates to a motor vehicle door which is made up by attaching a door lining to an inner panel of a door main body which is constructed by connecting the inner panel to a door panel.

2. Description of the Related Art

A motor vehicle door is conventionally manufactured by mounting various outfits or parts to a door main body through openings which are formed in an inner panel of the door main body, attaching or patching to the inner panel seals for closing the openings, and thereafter mounting a door lining to the inner panel.

In the above-described conventional motor vehicle door, there are the following disadvantages. Namely, it takes time to mount various fittings and, since the work of attaching the seals is required, the door assembly work cannot be carried out efficiently. Further, poor sealing may give rise to a problem in that rain water penetrates into a vehicle compartment through the openings in the inner panel.

Further, U.S. Pat. No. 4,151,683 discloses a power window type of motor vehicle door which has the following construction. Namely, inside containing recessed portions which are provided in a recessed manner in the inner panel, there is contained a power unit which is made up of an electric motor for vertically moving a window pane (glass), and a regulator arm which serves as a power transmission mechanism for vertically moving the window pane and which is coupled to the electric motor. The arm is coupled to the window pane inside the door main body via a vertically elongated slit which is formed in the inner panel. This slit, however, cannot be closed by a seal and therefore has a problem in sealing characteristics.

SUMMARY OF THE INVENTION

In view of the above points, the present invention has an object of providing a motor vehicle door which can be efficiently assembled with an improved sealing characteristics.

In order to attain the above object, the present invention is a motor vehicle door comprising: a door main body made up by connecting an inner panel to a door panel; and a door lining mounted on said inner panel; wherein the inner panel is provided, in a recessed manner, with containing recessed portions for receiving therein various outfits to be mounted on the motor vehicle door, and is integrally provided, in a projecting manner, with a pocket mounting base for fastening thereto a bottom portion of a pocket which is detachably attached to an armrest portion of the door lining.

Since each of the outfits can be mounted from outside the door main body to each of the containing recessed portions, the work of mounting becomes easy. Further, unlike a motor vehicle door in which openings are provided in the inner panel, the work of adhering or patching seals becomes unnecessary. As a result, the assembly man-hour can be reduced and the sealing characteristics against the rain water as well as the heat- and sound-insulating characteristics are also improved. Furthermore, by fastening the bottom of the pocket to the pocket mounting base, the door lining is fixed to the inner panel via the pocket. Conventionally, a pocket bracket which serves as the pocket mounting base is mounted to the inner panel. To the contrary, by integrally forming the pocket mounting base in the inner panel as in the present invention, the cost can be reduced in conjunction with the omission of the sealing work of the openings.

In case the motor vehicle door is of a power window type which is provided with an electric motor for vertically moving a window pane, the following arrangement may be employed. Namely, there is mounted inside the door main body a guide frame into which the window pane and a power transmission mechanism for vertically moving the window pane are assembled, the power transmission mechanism having an input portion driven by the electric motor, and the containing recessed portion for receiving therein the electric motor has an axial hole, and an output shaft of the electric motor is coupled through the axial hole to a coupling portion provided in the input portion. Then, unlike the conventional example, it is not necessary to form a slit, with the result that the characteristics for sealing, heat insulation and sound insulation are improved.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF PREFERRED EMBODIMENTS

Figure 1A:
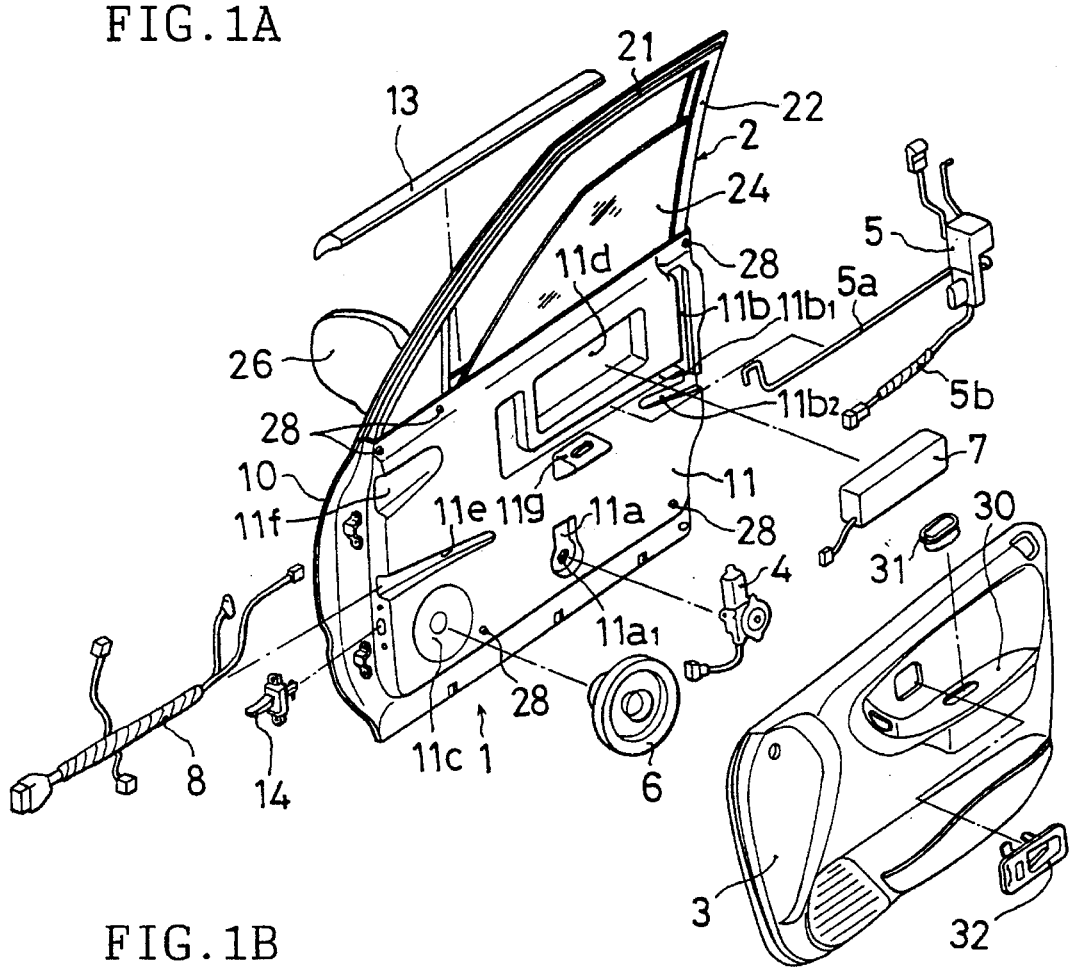
FIGS. 1A and 1B are an exploded perspective view of one example of the motor vehicle door of the present invention and a perspective view of an assembled condition thereof, respectively.
Figure 1B:
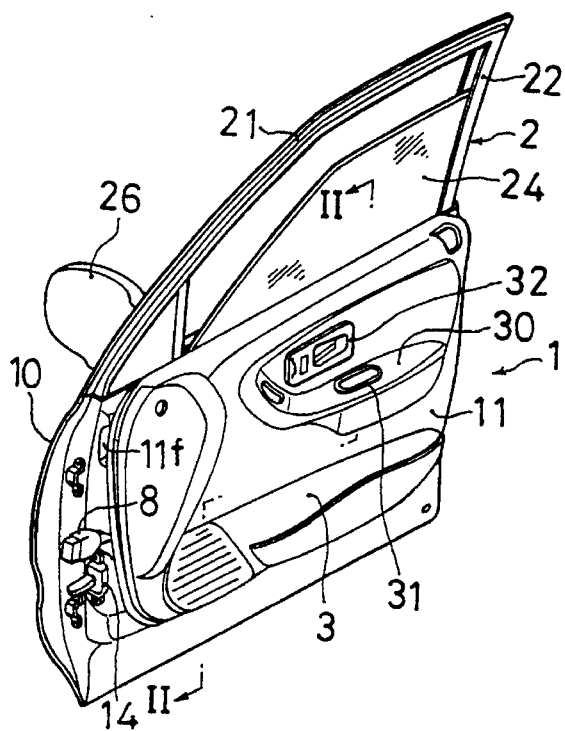
Figure 3:
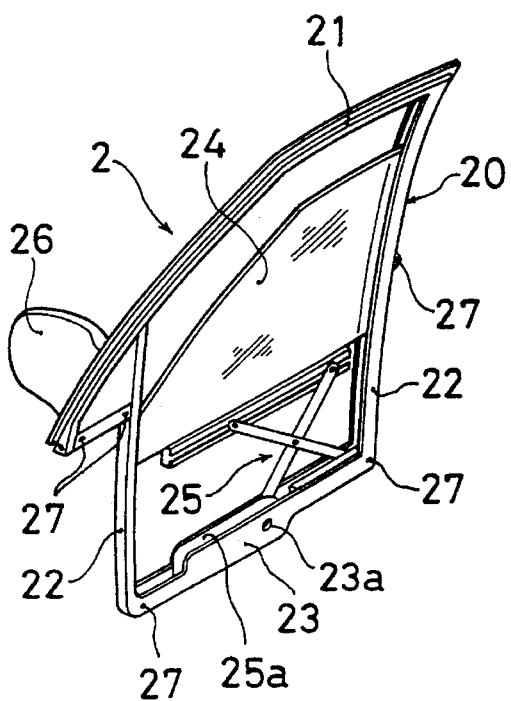
FIG. 3 is a perspective view of a window pane assembly to be assembled into the motor vehicle door.

In FIGS. 1A and 1B, numeral 1 denotes a door main body which is constructed by connecting an inner panel 11 to a door panel 10. A window pane (glass) assembly 2 shown in FIG. 3 is inserted into the door main body 1 through an upper edge opening portion in the door main body 1. Furthermore, a door lining 3 is attached to the inner panel 11.

The window pane assembly 2 is made up by assembling a window pane 24, a power transmission mechanism 25, which is made up of an X-link type of regulator, for vertically moving the window pane 24, and a door mirror 26 to a loop-shaped guide frame 20 which is made up by integrally arranging an upper sash 21, a pair of front and rear lower sashes 22, 22, and a cross member 23 which extends between the lower edges of the lower sashes 22, 22. In a condition in which a lower half portion of the window pane assembly 2 is inserted into the door main body 1, the window pane assembly 2 is fixed to the inner panel 11 with screws 28 at screw holes 27 formed in the lower edge portion of the upper sash 21 and the lower edge portions of the lower sashes 22, 22.

The inner panel 11 is provided with a plurality of containing recesses 11a–11e. An electric motor 4 for vertically moving the window pane 24 is contained in the containing recess 11a, a door lock 5 in the containing recess 11b, a loud speaker 6 in the containing recess 11c, a side air bag 7 in the containing recess 11d, and a harness 8 in the containing recess 11e, respectively. When the electric motor 4 for vertically moving the window pane is mounted in the containing recess 11a, an output shaft of the electric motor 4 is coupled to a coupling portion provided in an input portion 25a of the power transmission mechanism 25 through a shaft hole $11a_1$ formed in the containing recess 11a and a shaft hole 23a formed in the cross member 23. The window pane 24 can thus be vertically moved by the electric motor 4 via the power transmission mechanism 25.

Figure 2:
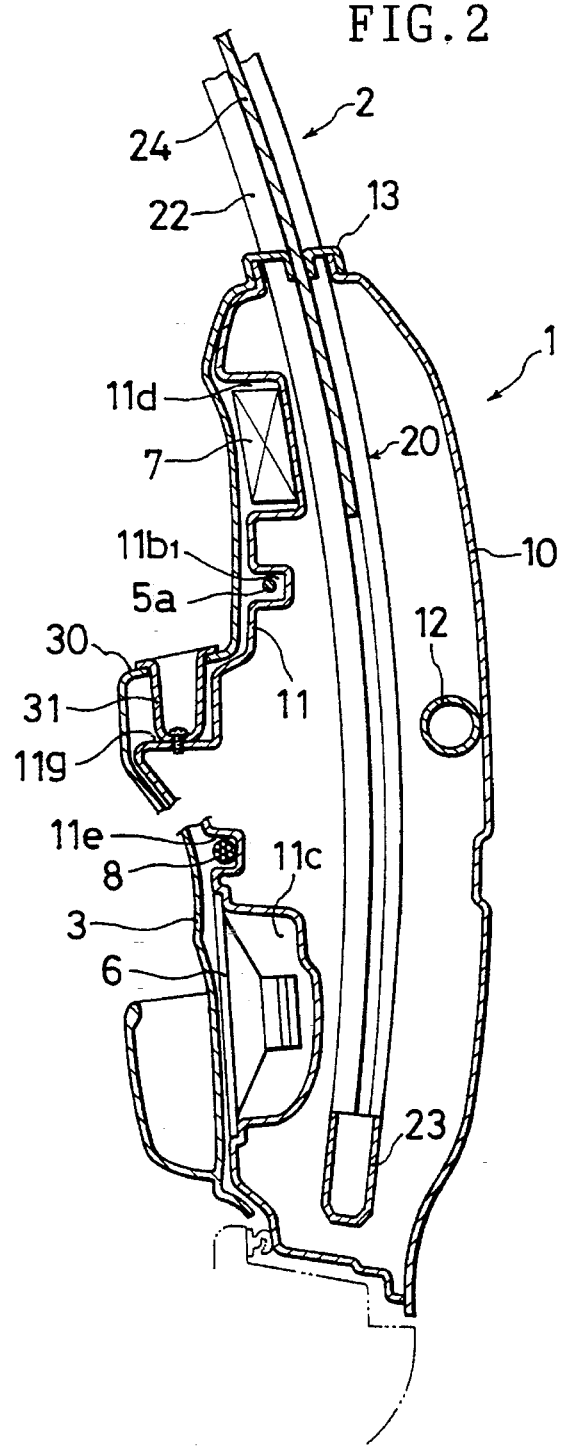
FIG. 2 is a sectional view of the motor vehicle door taken along the line II—II in FIG. 1B.

Further, in the inner panel 11 there are continuously formed, in the containing recess 11b, guide grooves $11b_1$ $11b_2$ for an operating rod 5a of the door lock 5 and for an electromagnetic lock connector 5b, respectively, as well as a ventilating groove 11f for a side defroster. The inner panel 11 is further integrally provided, in a projecting manner, with a pocket mounting base 11g for a pocket 31 which is detachably attached to an armrest portion 30 of the door lining 3. The door lining 3 is engaged with the inner panel 11 by means of adequate clips (not illustrated) which are provided on a rear surface of the door lining 3 in a projecting manner. The door lining 3 is arranged to be fixed to the inner panel 11 by fastening the pocket 31 at its bottom portion to the mounting base 11g, as shown in FIG. 2.

In the Figures, numeral 12 represents a side beam which is mounted inside the door main body 1, numeral 13 represents an outer mold which is mounted on an upper edge opening portion of the door main body 1, numeral 14 represents a door checker which is mounted in a front edge of the door main body 1, and numeral 32 represents an inner door handle.

The assembling of the door is carried out in the following manner. Namely, after inserting the window pane assembly 2 into the door main body 1 and fixing it thereto, the outer mold 13 and the door checker 14 are attached. Various outfits or parts such as the electric motor 4 for vertically moving the window pane or the like are mounted into the respective containing recesses 11a–11e. The electric motor 4, the electromagnetic lock connector 5b for the door lock 5, the loud speaker 6, the side air bag 7, etc. are connected to the wire harness 8. The mounting of these outfits and the wiring work can all be carried out from an outside of the inner panel 11. Further, unlike in the conventional art, the inner panel has no openings for mounting the above-described outfits. Therefore, the work of attaching seals for closing the openings becomes unnecessary, with the result that the work efficiency is largely improved. Thereafter, an exterior door handle (not illustrated) is attached to the outer surface of the door panel 10, and the door lining 3 is mounted on the inner panel 11. The pocket 31 is attached to the armrest portion 30 of the door lining 3, and the bottom portion thereof is fastened to the pocket mounting base 11g. The interior door handle 32 is mounted on the door lining 3 so as to be engaged with the operating rod 5a of the door lock 5.

An explanation has so far been made about an embodiment in which the electric motor 4 for vertically moving the window pane, the door lock 5, the loud speaker 6, the side air bag 7, and the harness 8 are mounted on the inner panel 11. The present invention can, of course, be applied when outfits other than the above are mounted.

As can be seen from the above explanations, according to the present invention, the inner panel has no openings for mounting the outfits. Therefore, the sealing characteristics, and thermal- and sound-insulating characteristics are improved. Further, the door can be efficiently assembled and the number of parts can be decreased, with a consequent large reduction in the door manufacturing cost.

It is readily apparent that the above-described motor vehicle door meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A motor vehicle door comprising:

a door main body made up by connecting an inner panel to a door panel; and a door lining mounted on said inner panel;

wherein said inner panel is provided, in a recessed manner, with containing recessed portions for receiving therein various outfits to be mounted on said motor vehicle door, and is integrally provided, in a projecting manner, with a pocket mounting base for fastening thereto a bottom portion of a pocket which is detachably attached to an armrest portion of said door lining.

2. A motor vehicle door according to claim 1, wherein said outfits include an electric motor for vertically moving a window pane;

wherein there is mounted inside said door main body a guide frame into which said window pane and a power transmission mechanism for vertically moving said window pane are assembled, said power transmission mechanism having an input portion driven by said electric motor;

wherein said containing recessed portion for receiving therein said electric motor has an axial hole; and wherein an output shaft of said electric motor is coupled through said axial hole to a coupling portion provided in said input portion.

* * * * *